US012231879B2

(12) United States Patent
Kim

(10) Patent No.: US 12,231,879 B2
(45) Date of Patent: Feb. 18, 2025

(54) OPERATING METHOD FOR AUSF AND UDM FOR AUTHENTICATION AND AUTHORIZATION FOR EACH NETWORK SLICE

(71) Applicant: LG Electronics Inc., Seoul (KR)

(72) Inventor: Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 17/625,309

(22) PCT Filed: Oct. 20, 2020

(86) PCT No.: PCT/KR2020/014297
§ 371 (c)(1),
(2) Date: Jan. 6, 2022

(87) PCT Pub. No.: WO2021/167200
PCT Pub. Date: Aug. 26, 2021

(65) Prior Publication Data
US 2022/0386120 A1  Dec. 1, 2022

(30) Foreign Application Priority Data
Feb. 20, 2020 (KR) .................. 10-2020-0021235

(51) Int. Cl.
*H04W 12/06* (2021.01)
*H04W 48/08* (2009.01)

(52) U.S. Cl.
CPC .......... *H04W 12/06* (2013.01); *H04W 48/08* (2013.01)

(58) Field of Classification Search
CPC ..................... H04W 72/23; H04B 7/0695
(Continued)

(56) References Cited

U.S. PATENT DOCUMENTS

2020/0053083 A1   2/2020 Kunz et al.
2020/0092776 A1*  3/2020 Edge ............... H04W 36/08
(Continued)

FOREIGN PATENT DOCUMENTS

KR   20190117697   10/2019

OTHER PUBLICATIONS

Ericsson, "DraftCR—Proposed flow for Re-authentication and Re-authorization," S3-194539 (Revision of S3-194213), Change Request, Presented at 3GPP TSG-SA WG3 Meeting #97, Reno (US), Nov. 18-22, 2019, 6 pages.

(Continued)

*Primary Examiner* — Fabricio R Murillo Garcia
(74) *Attorney, Agent, or Firm* — Fish & Richardson P.C.

(57) ABSTRACT

One disclosure of the present specification provides an operating method for an authentication server function (AUSF) apparatus. The operating method comprises the steps of: requesting a unified data management (UDM) apparatus for information about a serving access and mobility management function (AMF) apparatus for user equipment (UE); receiving, from the UDM apparatus, information indicating that the serving AMF apparatus for the UE is not present and an indication indicating or instructing maintenance of information about authentication and authorization for each network slice; receiving, from the UDM apparatus, information about a new serving AMF apparatus for the UE; and transmitting, to the new serving AMF apparatus, the information about authentication or authorization.

13 Claims, 20 Drawing Sheets

(58) Field of Classification Search
USPC .......................................................... 455/411
See application file for complete search history.

(56) References Cited

U.S. PATENT DOCUMENTS

2020/0162919 A1* 5/2020 Velev .................... H04W 60/00
2020/0267554 A1* 8/2020 Faccin .................. H04L 63/101
2021/0352481 A1* 11/2021 Guo .................... H04W 12/106

OTHER PUBLICATIONS

Huawei & HiSilicon, "Update Slice-Specific Authentication and Authorisation," S2-1905664 (Revision of S2-1904723), Change Request, Presented at 3GPP TSG-SA WG2 Meeting #133, May 13-17, 2019, Reno, US, 23 pages.

Samsung, "Indication of "Redirection for EPS fallback for voice is possible"", S2-2002099, Change Request, Presented at TSG-SA2 Meeting #137-E, Online, Feb. 24-27, 2020, 18 pages.

* cited by examiner

OPERATING METHOD FOR AUSF AND UDM FOR AUTHENTICATION AND AUTHORIZATION FOR EACH NETWORK SLICE

CROSS-REFERENCE TO RELATED APPLICATIONS

This application is a National Stage application under 35 U.S.C. § 371 of International Application No. PCT/KR2020/014297, filed on Oct. 20, 2020, which claims the benefit of Korean Patent Application No. 10-2020-0021235, filed on Feb. 20, 2020. The disclosures of the prior applications are incorporated by reference in their entirety.

TECHNICAL FIELD

The present specification relates to mobile communications.

BACKGROUND

FIG. 1 is a structural diagram of an evolved mobile communication network.

The Evolved Packet Core (EPC) may include various components, and in FIG. 1, some of them, a Serving Gateway (S-GW) 52, a Packet Data Network Gateway (PDN GW) 53, Mobility Management Entity (MME) 51, Serving General Packet Radio Service (GPRS) Supporting Node (SGSN), enhanced Packet Data Gateway (ePDN) are shown.

The S-GW 52 is an element that functions as a boundary point between the Radio Access Network (RAN) and the core network, and maintains a data path between the eNodeB 22 and the PDN GW 53. In addition, when a terminal (or User Equipment: UE) moves over an area served by the eNodeB 22, the S-GW 52 serves as a local mobility anchor point. That is, packets may be routed through the S-GW 52 for mobility within the E-UTRAN (Evolved Universal Mobile Telecommunications System (UTMS) Terrestrial Radio Access Network defined after 3GPP Release-8). In addition, the S-GW 52 may serve as an anchor point for mobility with other 3GPP networks (RAN defined before 3GPP Release-8, e.g., UTRAN or Global System for Mobile Communication (GSM)/Enhanced Data rates for Global Evolution (EDGE) Radio Access Network (GERAN)).

The PDN GW (or P-GW) 53 corresponds to the termination point of the data interface towards the packet data network. The PDN GW 53 may support policy enforcement features, packet filtering, charging support, and the like. In addition, the PDN GW 53 may serve as an anchor point for mobility management between the 3GPP network and the non-3GPP network (e.g., untrusted networks such as Interworking Wireless local area networks (I-WLANs), trusted networks such as Code Division Multiple Access (CDMA) networks).

In the example of the network structure of FIG. 1, the S-GW 52 and the PDN GW 53 are configured as separate gateways, but the two gateways may be implemented according to a single gateway configuration option.

The MME 51 is an element that performs signaling and control functions to support access to a network connection of the UE, allocation of network resources, tracking, paging, roaming and handover, etc. The MME 51 controls control plane functions related to subscriber and session management. The MME 51 manages a number of eNodeBs 22 and performs signaling for selection of a conventional gateway for handover to another 2G/3G network. In addition, the MME 51 performs functions such as security procedures, terminal-to-network session handling, and idle terminal location management.

The SGSN handles all packet data such as user's mobility management and authentication to other access3GPP networks (e.g., GPRS networks, UTRAN/GERAN).

The ePDG acts as a security node for untrusted non-3GPP networks (e.g., I-WLAN, Wi-Fi hotspots, etc.).

As described with reference to FIG. 1, the terminal (or UE) having IP capability may access an IP service network (e.g., IMS) provided by the operator via various elements in the EPC based on 3GPP access as well as non-3GPP access.

In addition, FIG. 1 shows various reference points (e.g., S1-U, S1-MME, etc). In the 3GPP system, a conceptual link connecting two functions existing in different functional entities of E-UTRAN and EPC is defined as a reference point. Table 1 below summarizes the reference points shown in FIG. 1. In addition to the examples in Table 1, various reference points may exist according to the network structure.

TABLE 1

| Reference points | Description |
| --- | --- |
| S1-MME | Reference point for control plane protocol between E-UTRAN and MME |
| S1-U | Reference point between E-UTRAN and SGW for inter-eNB path switching and per-bearer user plane tunneling during handover |
| S3 | Reference point between MME and SGSN providing user and bearer information exchange for mobility between 3GPP access networks in idle and/or active state. This reference point may be used for intra-Public Land Mobile Network (PLMN) or inter-PLMN (e.g., in case of inter-PLMN handover). |
| S4 | Reference point between the SGW and SGSN providing related control and mobility support between the GPRS core and the 3GPP anchor function of the SGW. In addition, if a direct tunnel is not established, user plane tunneling is provided. |
| S5 | Reference point providing user plane tunneling and tunnel management between SGW and PDN GW. Used for SGW relocation when connection to a PDN GW not co-located with the SGW is required due to UE mobility and for the required PDN connectivity |
| S11 | Reference point between MME and SGW |
| SGi | Reference point between PDN GW and PDN. The PDN may be a public or private PDN external to the operator or an intra-operator PDN for e.g., provision of an IMS service. This reference point corresponds to Gi of 3GPP access. |

Among the reference points shown in FIG. 1, S2a and S2b correspond to non-3GPP interfaces. S2a is a reference point that provides related control and mobility support between trusted non-3GPP access and PDN GWs to the user plane. S2b is a reference point that provides related control and mobility support between ePDG and PDN GW to the user plane.

<Next-Generation Mobile Communication Network>

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020".

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 2

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 3 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 2 is a structural diagram of a next-generation mobile communication network.

The 5G Core network (5GC) may include various components, part of which are shown in FIG. 2, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN) (i.e., gNB or base station).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 3 is an exemplary diagram illustrating a predicted structure of a next generation mobile communication in terms of a node.

Referring to FIG. 3, the UE is connected to a Data Network (DN) through a NG-RAN.

The Control Plane Function (CPF) node as shown may perform all or part of the Mobility Management Entity (MME) function of the fourth-generation mobile communication, and all or a part of the control plane function of the Serving Gateway (S-GW) and the PDN-Gateway (P-GW) of the fourth-generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth-generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 3, a UE can simultaneously access two data networks using multiple Protocol Data Unit (PDU) sessions.

FIG. 4 is an exemplary diagram illustrating an architecture for supporting simultaneously access two data networks.

FIG. 4 illustrates an architecture that allows the UE to simultaneously access two data networks using one PDU session.

Reference points shown in FIGS. 3 and 4 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.

N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

In the next-generation (i.e., fifth-generation) mobile communication, it is considered to provide local services (or specialized services for each geographic area). In the next-generation mobile communication, such a local service is being referred to as LADN.

On the other hand, among network nodes, a Network Data Analytics Function (NWDAF) could collect UE mobility-related information and generate UE mobility statistics or predictions through data analysis.

In addition, redundant transmission is being discussed for URLCC in next-generation (i.e., fifth-generation) mobile communication.

However, research on the extension of the NWDAF function is required for redundant transmission, but there is a difficulty that has not been actively carried out so far.

SUMMARY

Accordingly, an object of the present specification is to propose a method for solving the above-described problems.

In order to solve the above-described problems, a disclosure of the present specification provides a method of operating an Authentication Server Function (AUSF) device. The method may comprise: requesting, from a Unified Data Management (UDM) device, information on a serving Access and mobility Management Function (AMF) device for a User Equipment (UE); receiving, from the UDM device, information informing that there is no serving AMF device for the UE and an indication informing or indicating maintenance of information on a network slice-specific authentication and authorization; receiving, from the UDM device, information on a new serving AMF device for the UE; and transmitting, to the new serving AMF device, information on authentication or authorization.

In order to solve the above-described problems, a disclosure of the present specification provides a method of operating a Unified Data Management (UDM) device. The method may comprise: receiving, from an Authentication Server Function (AUSF) device, a request for information on a serving Access and mobility Management Function (AMF) device for a User Equipment (UE); transmitting, to the AUSF device, information informing that there is no serving AMF device for the UE and an indication informing or indicating maintenance of information on a network slice-specific authentication and authorization; and transmitting, to the AUSF device, information on a new serving AMF device for the UE.

In order to solve the above-described problems, a disclosure of the present specification provides a chipset mounted on an Authentication Server Function (AUSF) device. The chipset may comprise: at least one processor; and at least one memory for storing instructions and operably electrically connectable to the at least one processor. The instructions, based on being executed by the at least one processor, may perform operations comprising: requesting, from a Unified Data Management (UDM) device, information on a serving Access and mobility Management Function (AMF) device for a User Equipment (UE); receiving, from the UDM device, information informing that there is no serving AMF device for the UE and an indication informing or indicating maintenance of information on a network slice-specific authentication and authorization; receiving, from the UDM device, information on a new serving AMF device for the UE; and transmitting, to the new serving AMF device, information on authentication or authorization.

In order to solve the above-described problems, a disclosure of the present specification provides a chipset mounted on a Unified Data Management (UDM) device. The chipset may comprise: at least one processor; and at least one memory for storing instructions and operably electrically connectable to the at least one processor. The instructions, based on being executed by the at least one processor, may perform operations comprising: receiving, from an Authentication Server Function (AUSF) device, a request for information on a serving Access and mobility Management Function (AMF) device for a User Equipment (UE); transmitting, to the AUSF device, information informing that there is no serving AMF device for the UE and an indication informing or indicating maintenance of information on a network slice-specific authentication and authorization; and transmitting, to the AUSF device, information on a new serving AMF device for the UE.

In order to solve the above-described problems, a disclosure of the present specification provides an Authentication Server Function (AUSF) device. The AUSF device may comprise: a transceiver; at least one processor; and at least one memory for storing instructions and operably electrically connectable to the at least one processor. The instructions, based on being executed by the at least one processor, may perform operations comprising: requesting, from a Unified Data Management (UDM) device, information on a serving Access and mobility Management Function (AMF) device for a User Equipment (UE); receiving, from the UDM device, information informing that there is no serving AMF device for the UE and an indication informing or indicating maintenance of information on a network slice-specific authentication and authorization; receiving, from the UDM device, information on a new serving AMF device for the UE; and transmitting, to the new serving AMF device, information on authentication or authorization.

In order to solve the above-described problems, a disclosure of the present specification provides a Unified Data Management (UDM) device. The UDM device may comprise: a transceiver; at least one processor; and at least one memory for storing instructions and operably electrically connectable to the at least one processor. The instructions, based on being executed by the at least one processor, may perform operations comprising: receiving, from an Authentication Server Function (AUSF) device, a request for information on a serving Access and mobility Management Function (AMF) device for a User Equipment (UE); transmitting, to the AUSF device, information informing that there is no serving AMF device for the UE and an indication informing or indicating maintenance of information on a network slice-specific authentication and authorization; and transmitting, to the AUSF device, information on a new serving AMF device for the UE.

In order to solve the above-described problems, a disclosure of the present specification provides a non-volatile computer-readable storage medium having recorded thereon instructions. The instructions, when executed by one or more processors mounted on an Authentication Server Function (AUSF) device, may cause the one or more processors to perform operation comprising: requesting, from a Unified Data Management (UDM) device, information on a serving Access and mobility Management Function (AMF) device for a User Equipment (UE); receiving, from the UDM device, information informing that there is no serving AMF device for the UE and an indication informing or indicating maintenance of information on a network slice-specific authentication and authorization; receiving, from the UDM device, information on a new serving AMF device for the UE; and transmitting, to the new serving AMF device, information on authentication or authorization.

In order to solve the above-described problems, a disclosure of the present specification provides a non-volatile computer-readable storage medium having recorded thereon instructions. The instructions, when executed by one or more processors mounted on an Unified Data Management (UDM) device, may cause the one or more processors to perform operation comprising: receiving, from an Authentication Server Function (AUSF) device, a request for information on a serving Access and mobility Management Function (AMF) device for a User Equipment (UE); transmitting, to the AUSF device, information informing that there is no serving AMF device for the UE and an indication informing or indicating maintenance of information on a network slice-specific authentication and authorization; and transmitting, to the AUSF device, information on a new serving AMF device for the UE.

According to the disclosure of the present specification, it is possible to solve the problems of the prior art.

DETAILED DESCRIPTION

Figure 1:
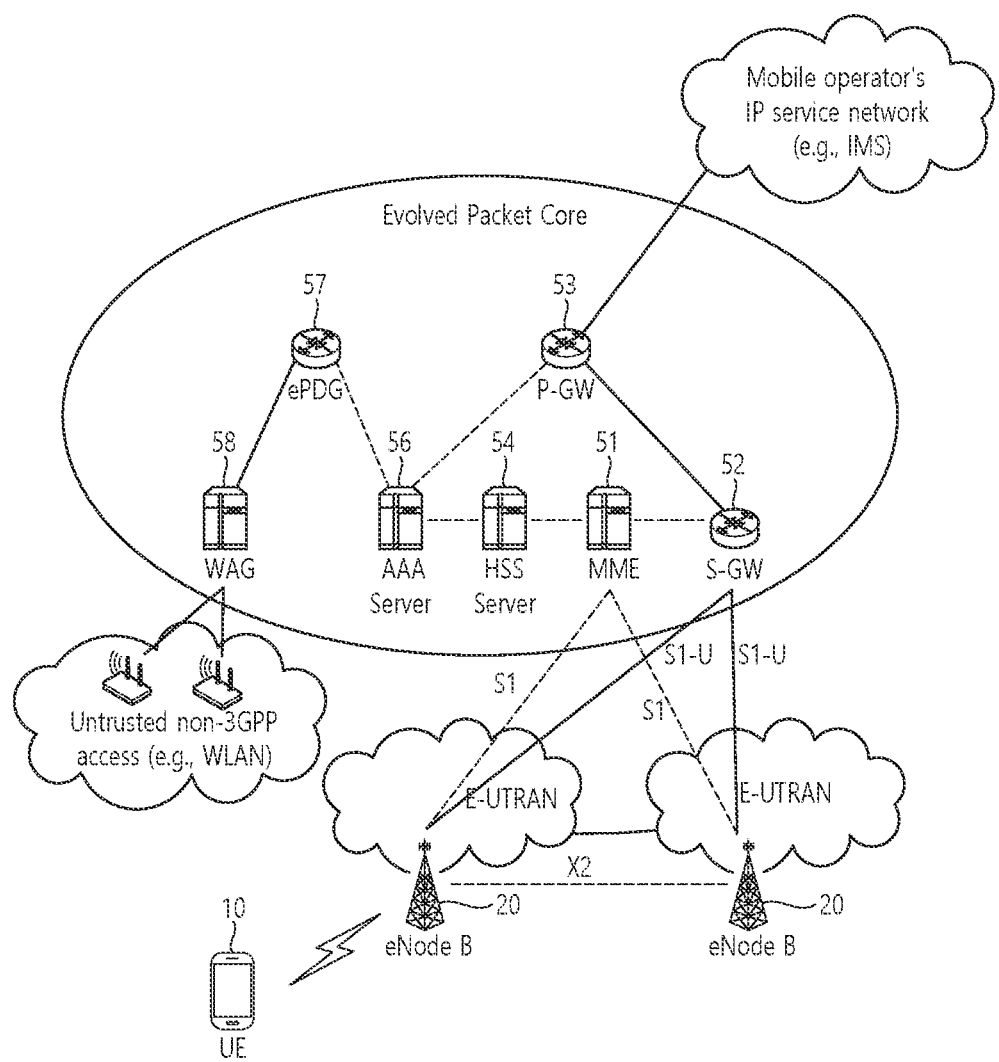
FIG. 1 is a structural diagram of an evolved mobile communication network.
Figure 2:
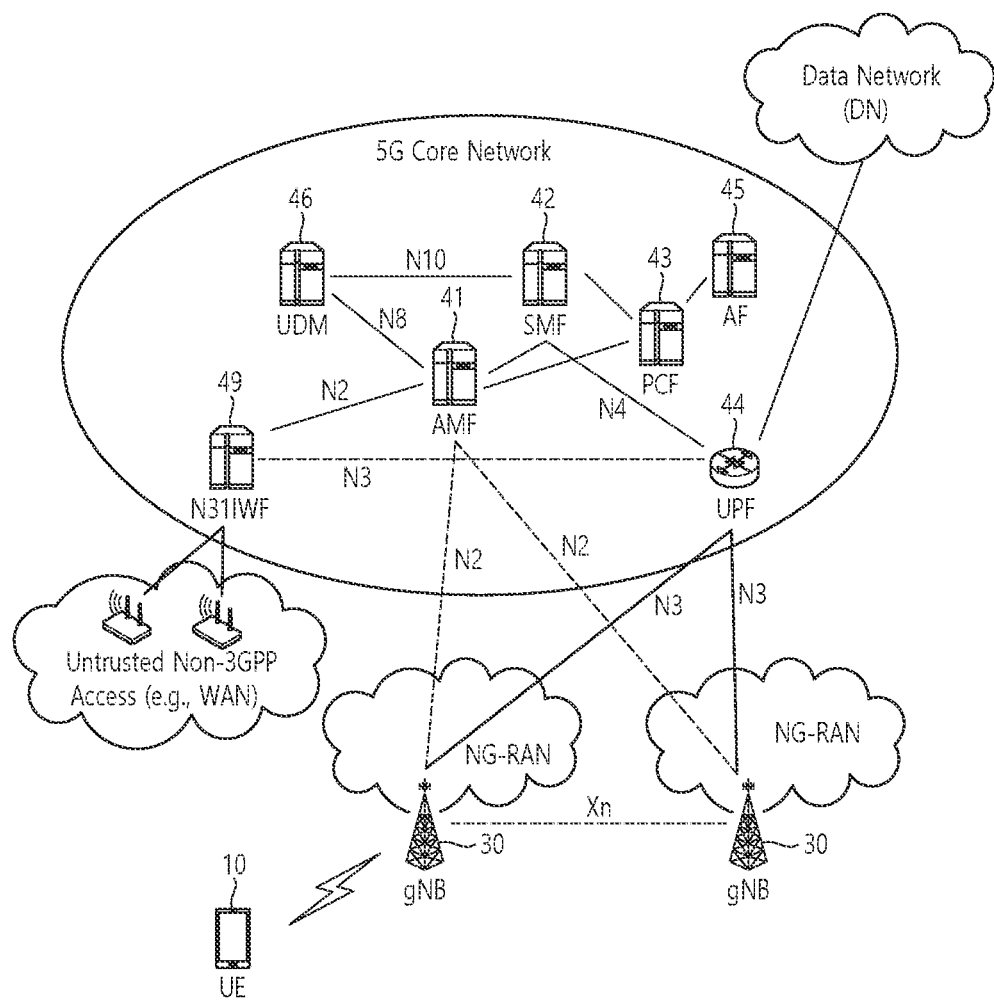
FIG. 2 is a structural diagram of a next-generation mobile communication network.
Figure 3:
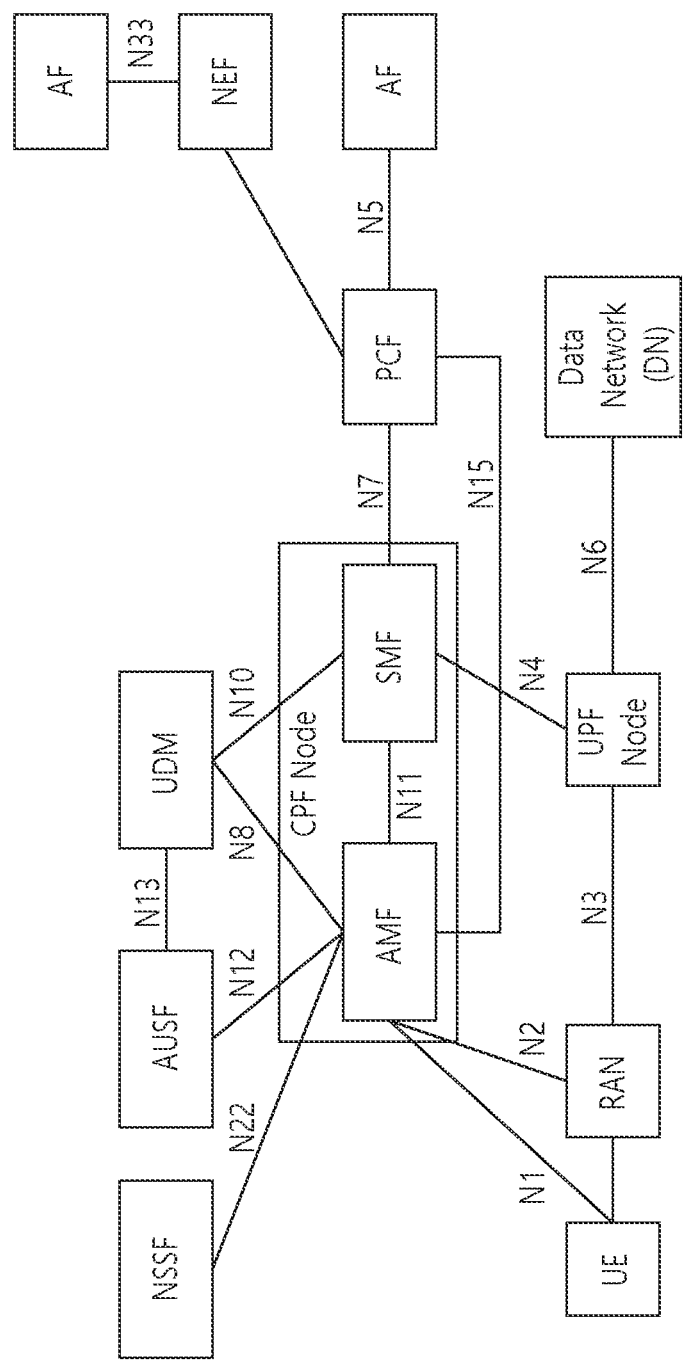
FIG. 3 is an exemplary diagram illustrating a predicted structure of a next generation mobile communication in terms of a node.
Figure 4:
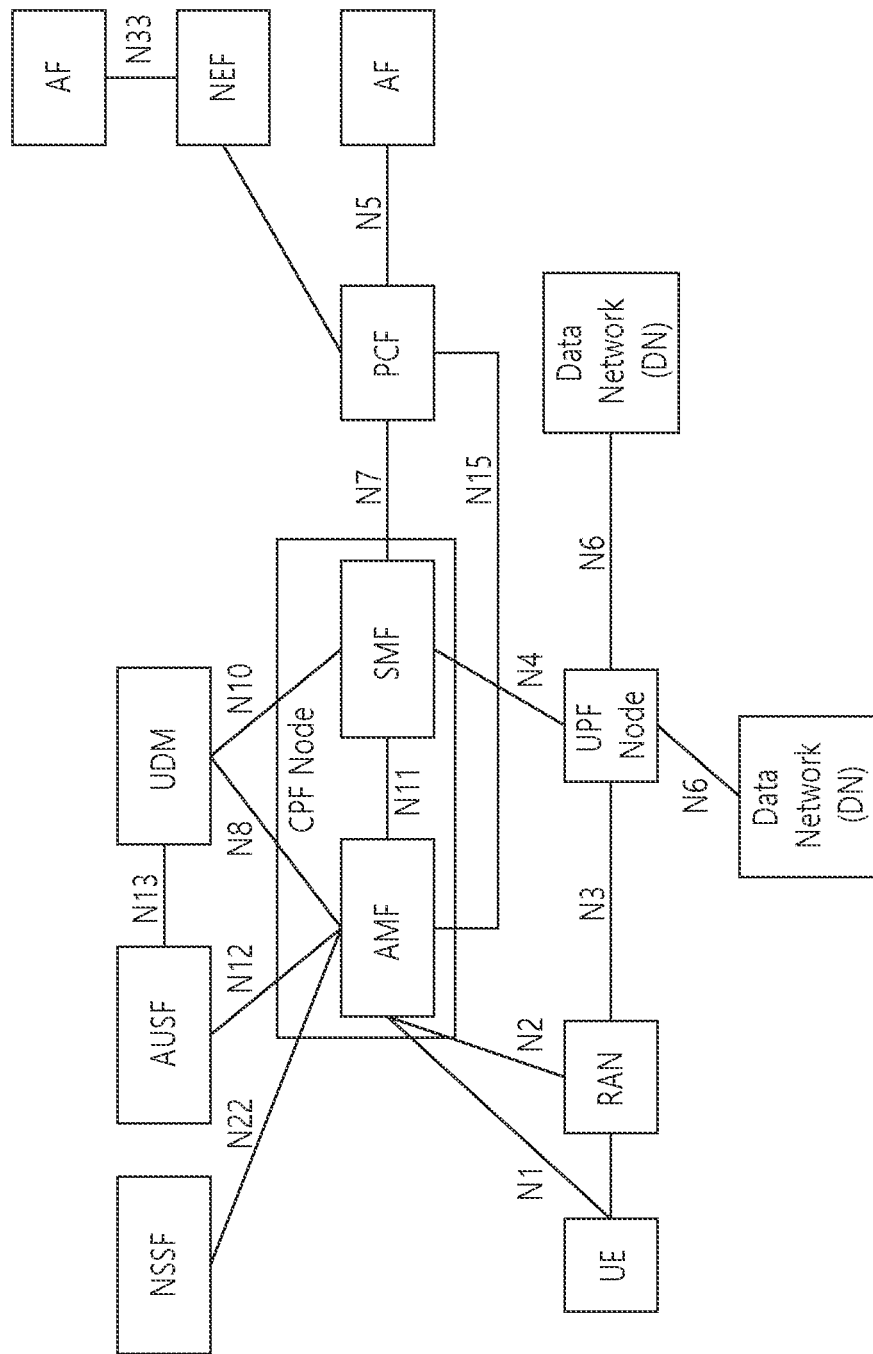
FIG. 4 is an exemplary diagram illustrating an architecture for supporting simultaneously access two data networks.
Figure 5:
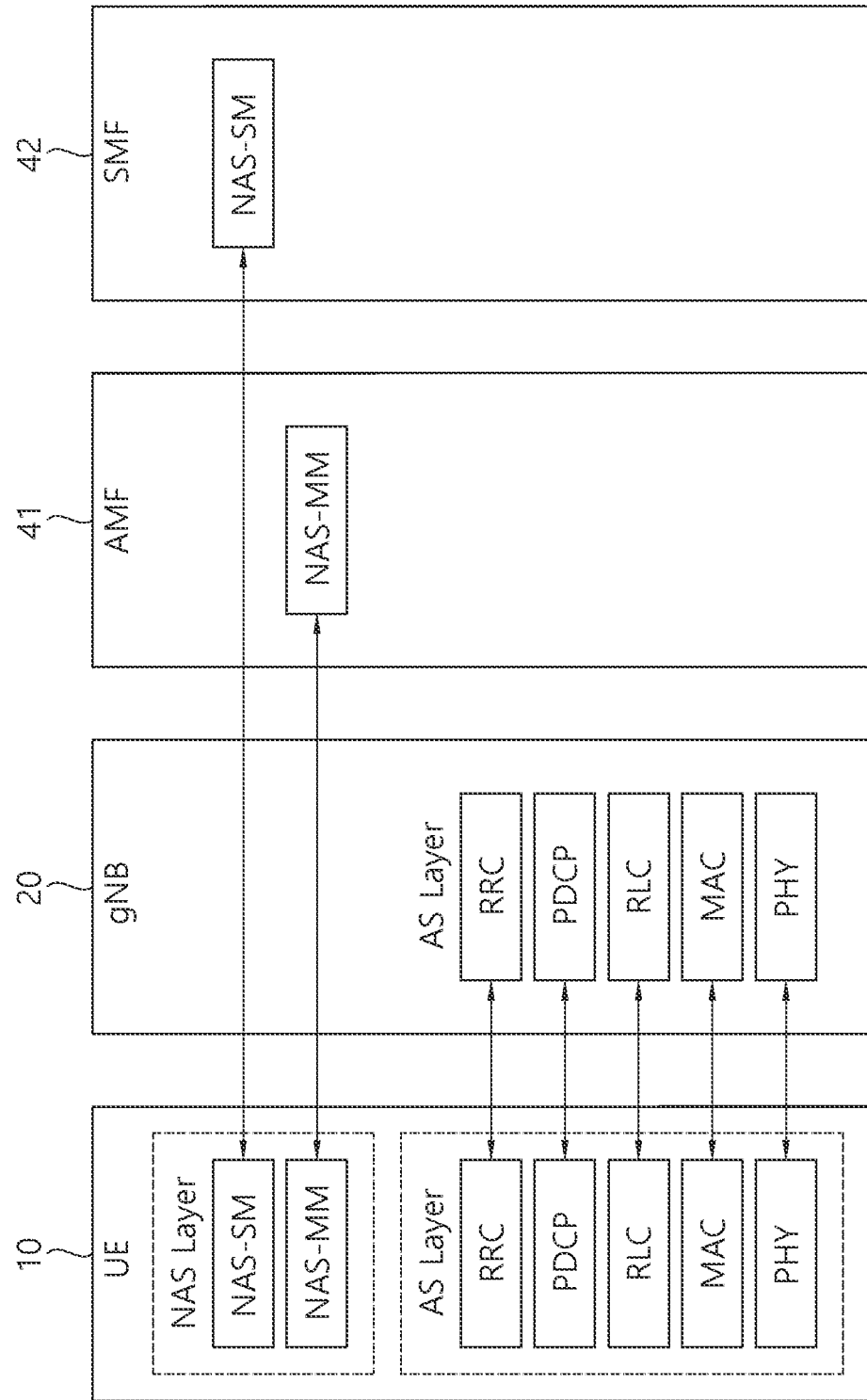
FIG. 5 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
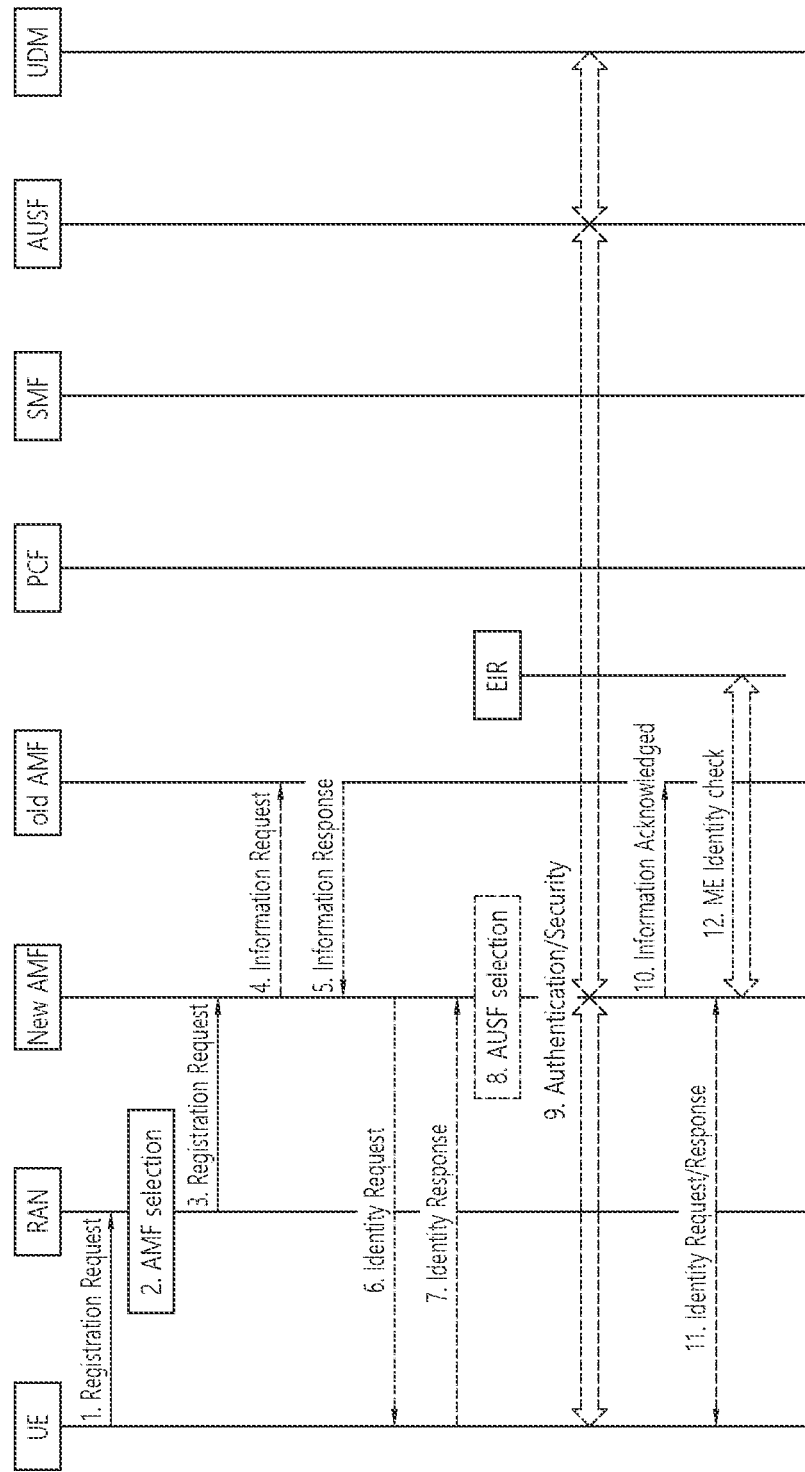
FIGS. 6a and 6b are a signal flowchart illustrating an exemplary registration procedure.
Figure 6B:
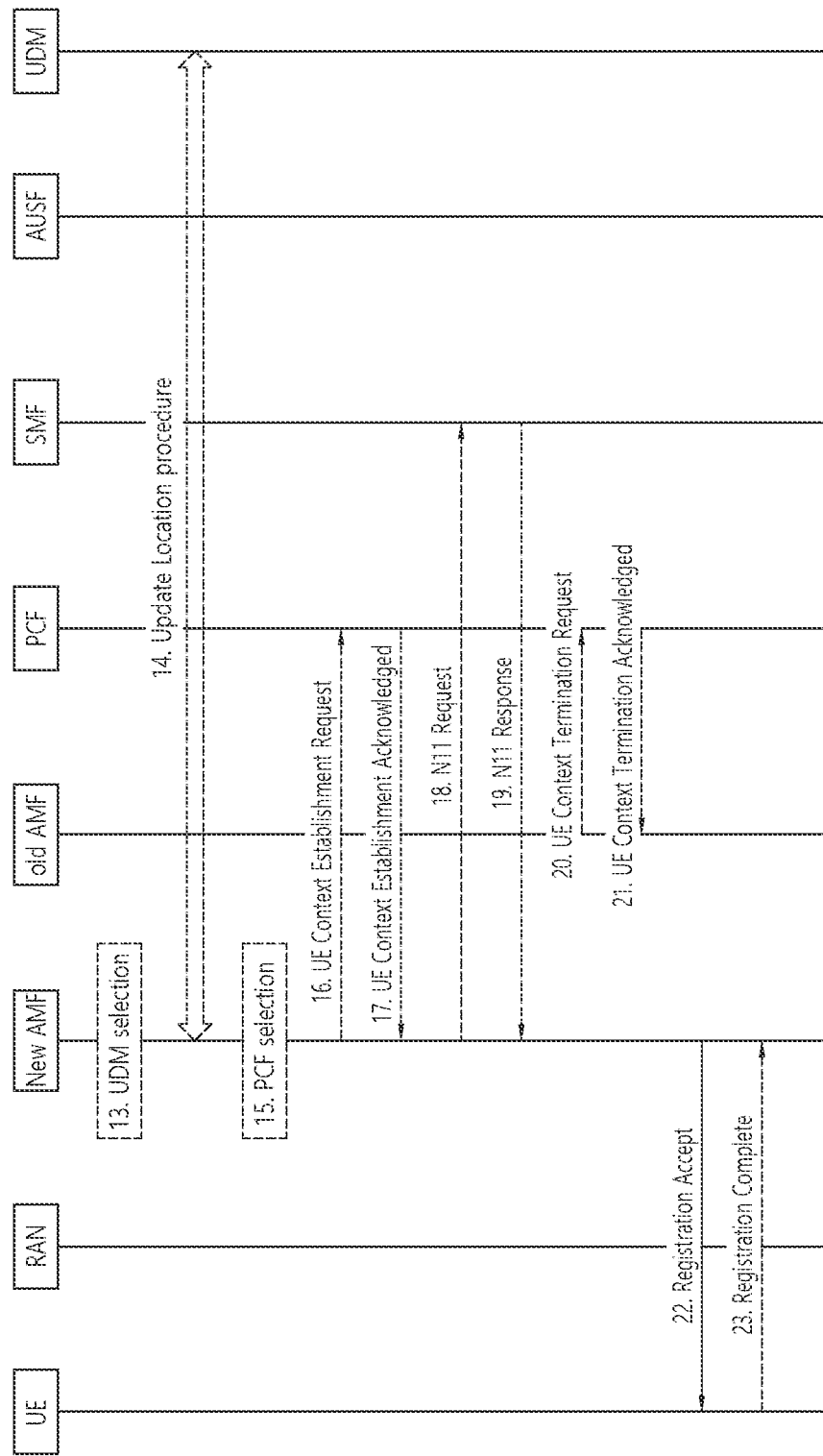

FIGS. 6a and 6b are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The

Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Network Slice>

Hereinafter, network slicing to be introduced in next-generation mobile communication will be described.

Next-generation mobile communication introduces the concept of network slicing in order to provide various services through one network. Here, the network slicing is a combination of network nodes having functions necessary to provide a specific service. A network node constituting a slice instance may be a hardware independent node or a logically independent node.

Each slice instance may be composed of a combination of all nodes necessary to configure the entire network. In this case, one slice instance may independently provide a service to the UE.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the Core Network (CN) node and the RAN can be separated. In addition, a slice instance is different from a dedicated core network in that network nodes can simply be logically separated.

Figure 7A:
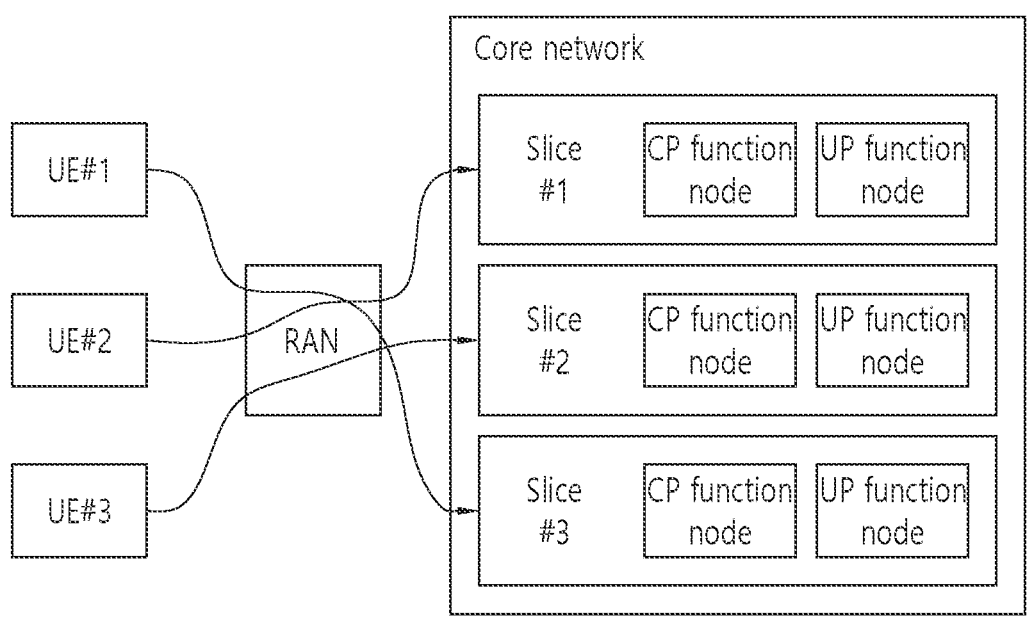
FIG. 7a is an exemplary diagram illustrating an example of an architecture for implementing the concept of network slicing.

FIG. 7a is an exemplary diagram illustrating an example of an architecture for implementing the concept of network slicing.

As can be seen with reference to FIG. 7a, the Core Network (CN) may be divided into several slice instances. Each slice instance may include one or more of a CP function node and a UP function node.

Each UE may use a network slice instance suitable for its own service through the RAN.

Unlike shown in FIG. 7a, each slice instance may share one or more of a CP function node and a UP function node with another slice instance. This will be described with reference to FIG. 7b as follows.

Figure 7B:
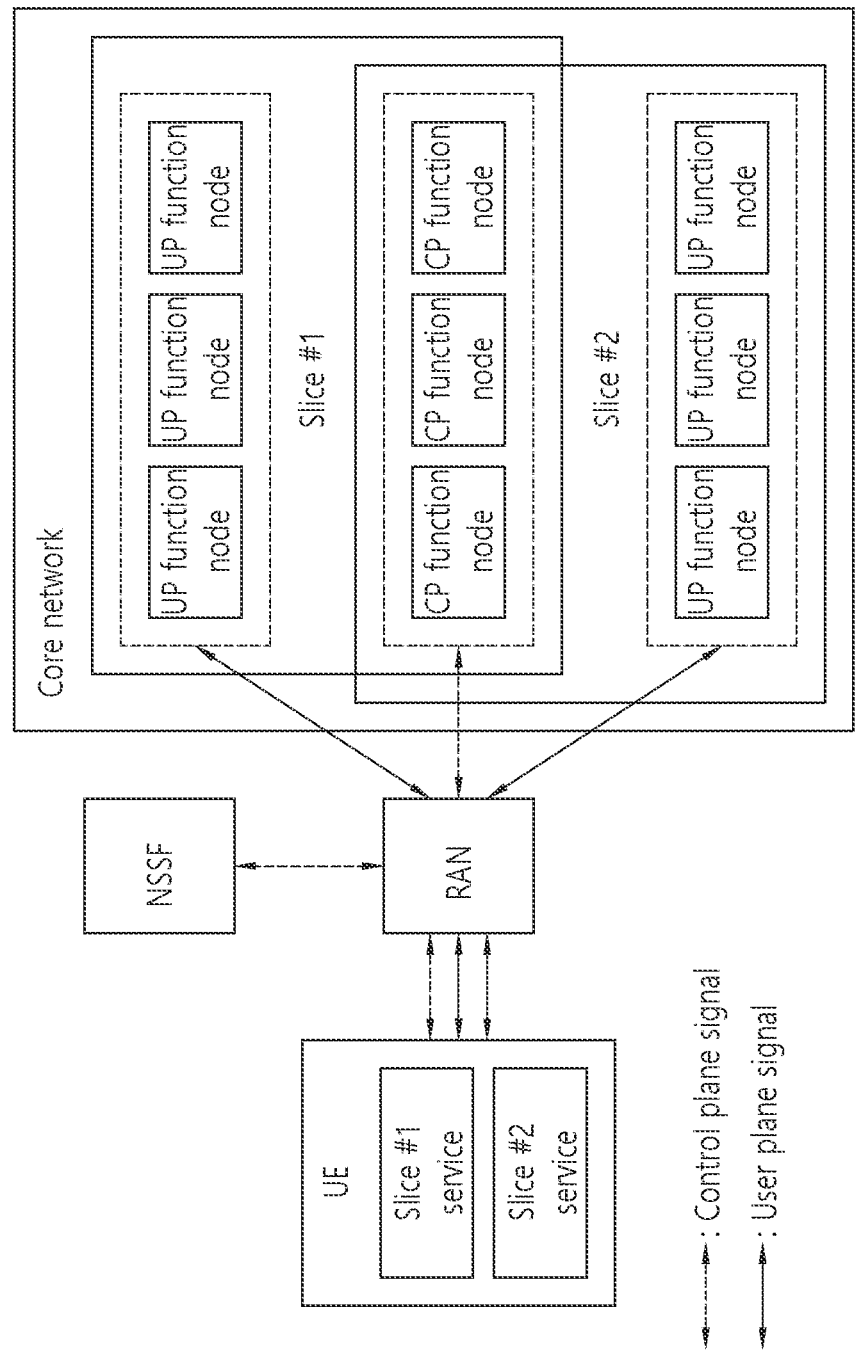
FIG. 7b is an exemplary diagram illustrating another example of an architecture for implementing the concept of network slicing.

FIG. 7b is an exemplary diagram illustrating another example of an architecture for implementing the concept of network slicing.

Referring to FIG. 7b, a plurality of UP functional nodes is clustered, and similarly, a plurality of CP functional nodes is also clustered.

And, referring to FIG. 7b, slice instance #1 (or referred to as instance #1) in the core network includes the first cluster of UP functional nodes. And, the slice instance #1 shares a cluster of CP functional nodes with slice #2 (or referred to as instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

<Network Slice-Specific Authentication and Authorization>

Meanwhile, the network slice-specific authentication and authorization procedure may be triggered for a Single Network Slice Selection Assistance Information (S-NSSAI) by an Authentication Authorization Accounting (AAA) server which may be hosted by the Home Public Land Mobile Network (H-PLMN) operator or by a third party which has a business relationship with the H-PLMN. An AAA Proxy (AAA-P) in the HPLMN may be involved, e.g., if the AAA server belongs to a third party.

This procedure is triggered during a registration procedure when some network slices require slice-specific authentication and authorization, when AMF determines that network slice-specific authentication and authorization is required in the current allowed NSSAI (e.g. subscription change), or when the AAA server that authenticated the network slice triggers a re-authentication.

The AMF performs Extensible Authentication Protocol (EAP) Authentication and communicates via the AUSF. The AUSF undertakes any AAA protocol interworking with the AAA protocol supported by the AAA server.

Figure 8A:
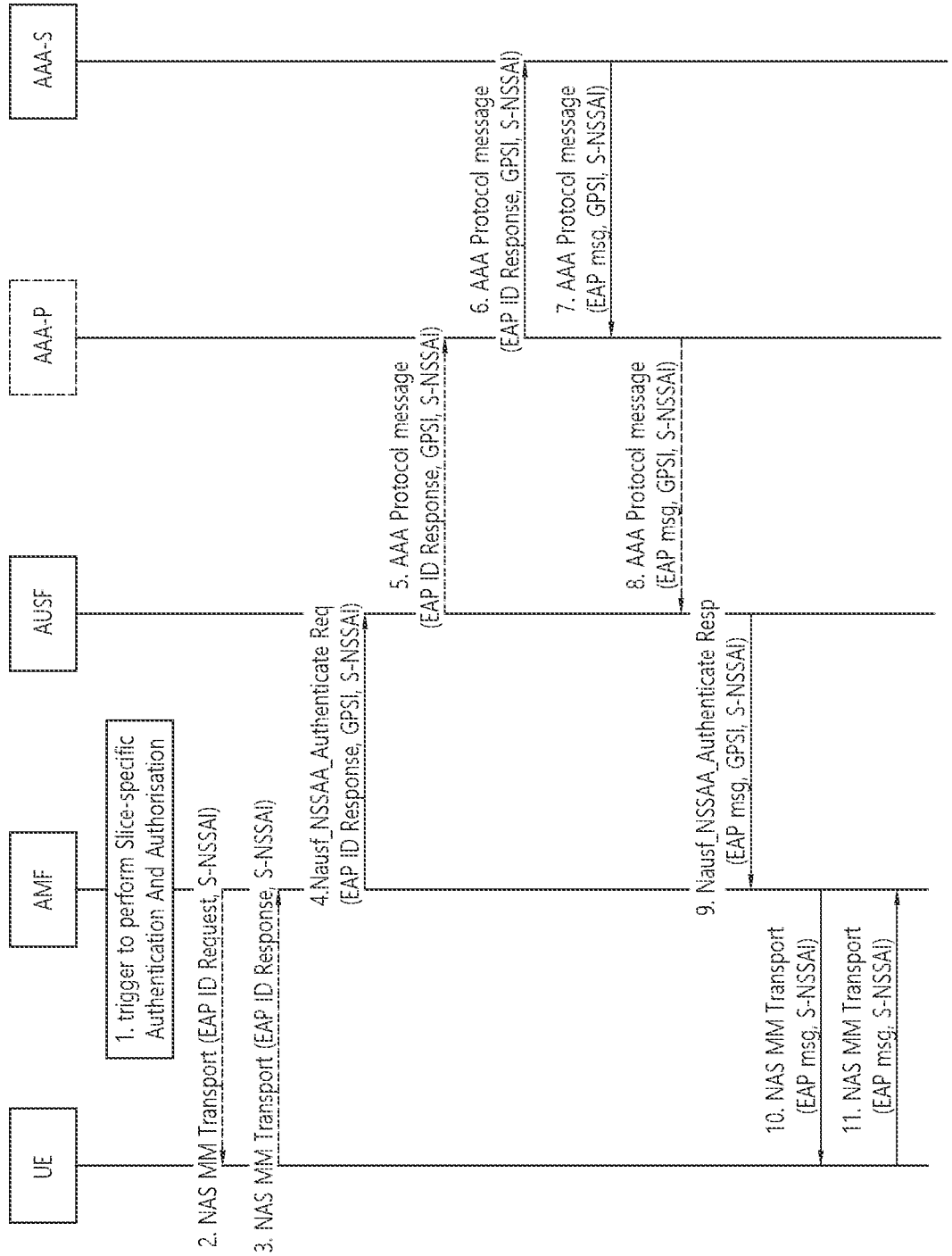
FIGS. 8a and 8b are flowcharts illustrating a network slice-specific authentication and authorization procedure.
Figure 8B:
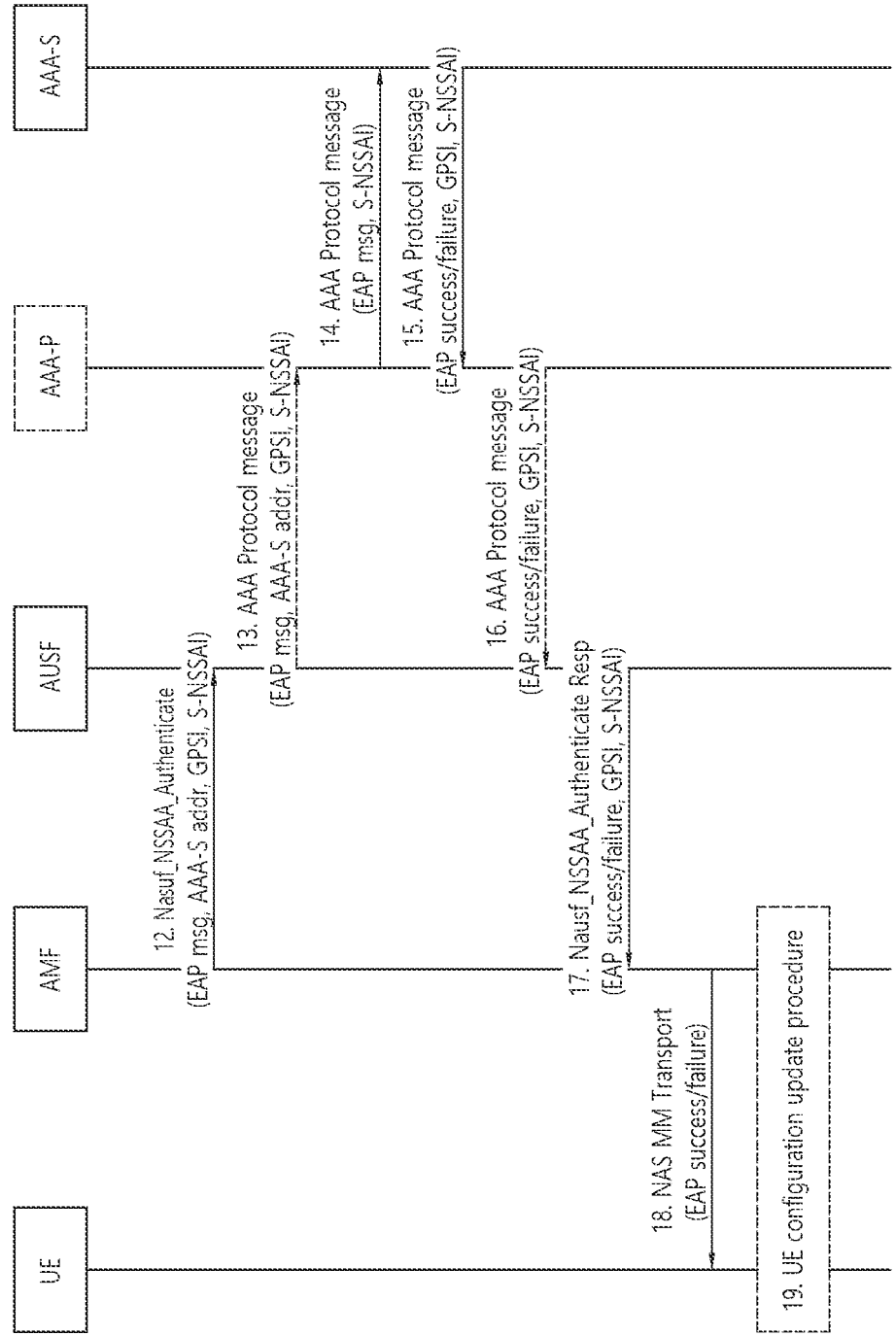

FIGS. 8a and 8b are flowcharts illustrating a network slice-specific authentication and authorization procedure.

1) For S-NSSAIs that are requiring network slice-specific authentication and authorization, based on change of subscription information, or triggered by the AAA server (i.e., AAA-S), the AMF may trigger the start of the network slice-specific authentication and authorization procedure.

If Network slice-specific authentication and authorization is triggered as a result of registration procedure, the AMF may determine, based on UE context in the AMF, that for some or all S-NSSAI(s) subject to network slice-specific authentication and authorization, the UE has already been authenticated following a registration procedure on a first access. Depending on network slice-specific authentication and authorization result being success or failure from the previous registration, the AMF may decide, based on network policies, to skip network slice-specific authentication and authorization for these S-NSSAIs during the registration on a second access.

If the network slice-specific authentication and authorization procedure corresponds to a re-authentication and re-authorization procedure triggered as a result of AAA server (i.e., AAA-S) triggered UE re-authentication and re-authorization for one or more S-NSSAIs, or triggered by the AMF based on operator policy or a subscription change and if S-NSSAIs that are requiring network slice-specific authentication and authorization are included in the allowed NSSAI for each access type, the AMF selects an access type to be used to perform the network slice-specific authentication and authorization procedure based on network policies.

2) The AMF may send an EAP identity request for the S-NSSAI in a NAS MM Transport message including the S-NSSAI. This may be the S-NSSAI of the H-PLMN, not the locally mapped S-NSSAI value.

3) The UE may provide the EAP identity response for the S-NSSAI alongside the S-NSSAI in an NAS MM Transport message.

4) The AMF may send the EAP identity response by including in a Nausf_NSSAA_Authenticate Request (including EAP identity response, AAA server (i.e., AAA-S) address, GPSI, S-NSSAI).

5) If the AAA-P is present (e.g., because the AAA server (i.e., AAA-S) belongs to a third party and the operator deploys a proxy towards third parties), the AUSF forwards the EAP ID response message to the AAA-P, otherwise the AUSF forwards the message directly to the AAA server (i.e., AAA-S). The AUSF uses towards the AAA-P or the AAA server (i.e., AAA-S) an AAA protocol message of the same protocol supported by the AAA server (i.e., AAA-S).

6) The AAA-P forwards the EAP Identity message to the AAA server (i.e., AAA-S) addressable by the AAA server (i.e., AAA-S) address together with S-NSSAI and GPSI.

7-14) EAP-messages are exchanged with the UE.

15) EAP authentication completes. The AAA server (i.e., AAA-S) stores the S-NSSAI for which the authorization has been granted, so it may decide to trigger reauthentication and reauthorization based on its local policies. An EAP-success/failure message is delivered to the AAA-P with GPSI and S-NSSAI.

16) If the AAA-P is used, the AAA-P sends a AAA protocol message including EAP-success/failure, S-NSSAI, GPSI to the AUSF.

17) The AUSF sends the ausfNSSAA_Authenticate Response including EAP-success/failure, S-NSSAI, GPSI to the AMF.

18) The AMF transmits a NAS MM Transport message including EAP-success/failure to the UE.

19) If the allowed NSSAI or rejected NSSAIs needs to be delivered to the UE, or if the AMF re-allocation is required, the AMF may initiate the UE configuration update procedure, for each access type. If the network slice-specific authentication and authorization fails for all S-NSSAIs in the allowed NSSAI, the AMF may execute the network-initiated deregistration procedure, and may transmit the de-registration request message including the list of rejected S-NSSAIs, each of them with the appropriate rejection cause value.

Figure 9:
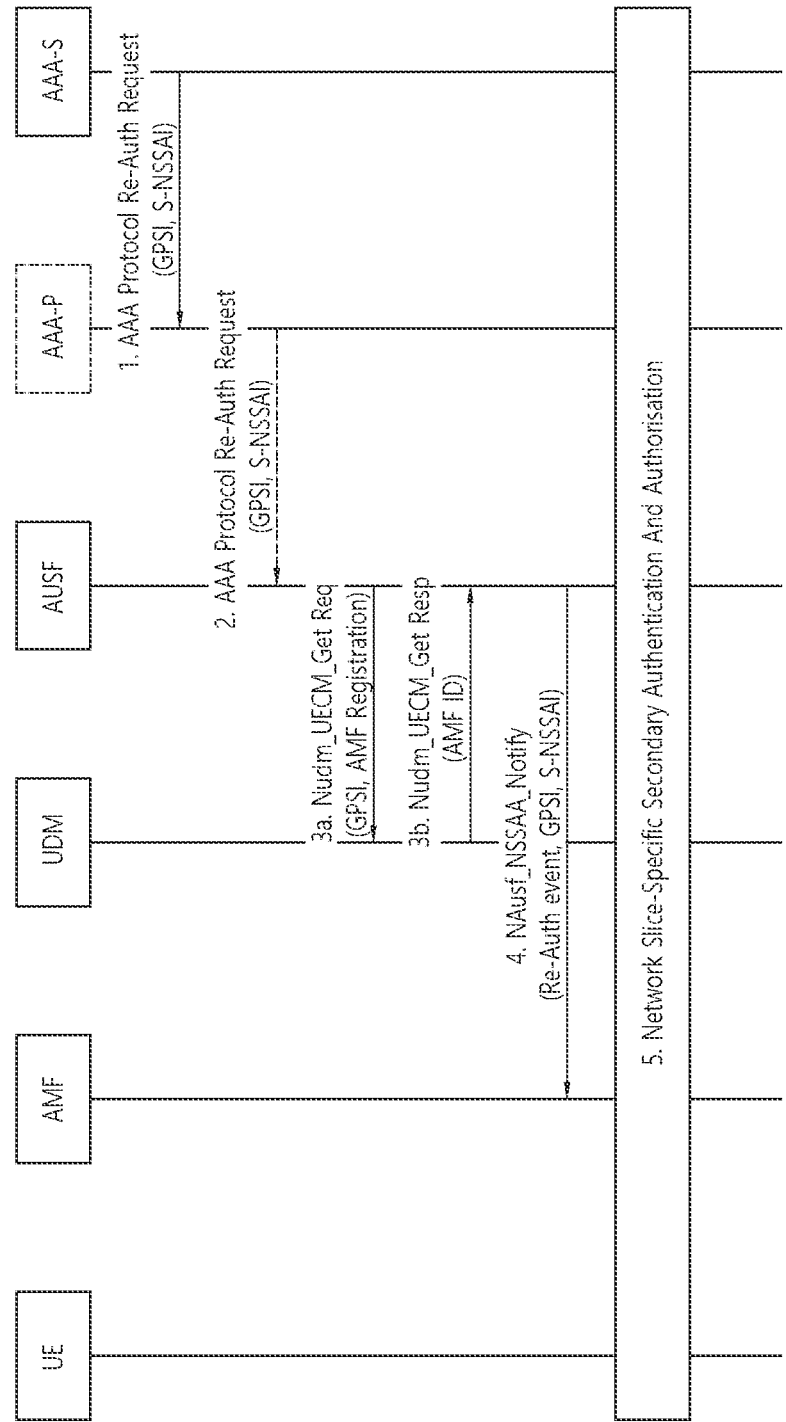
FIG. 9 is a flowchart illustrating a network slice-specific re-authentication and re-authorization procedure.

FIG. 9 is a flowchart illustrating a network slice-specific re-authentication and re-authorization procedure.

1) The AAA server (i.e., AAA-S) may request the re-authentication and re-authorization for the network slice specified by the S-NSSAI in the AAA protocol re-authentication request message. This message may be sent to a AAA-P, if the AAA-P is used, otherwise it may be sent directly to the AUSF.

2) The AAA-P may relay the request to the AUSF.

3a-3b) The AUSF may get AMF ID from the UDM using Nudm_UECM_Get with the GPSI in the received AAA message.

4) The AUSF may notify re-authentication event to the AMF to re-authenticate/re-authorize the S-NSSAI for the UE using Nausf_NSSAA_Notify with the GPSI and S-NSSAI in the received AAA message.

The callback URI of the notification for the AMF may be derived via NRF.

5) The AMF may trigger the network slice-specific authentication and authorization procedure.

Figure 10:
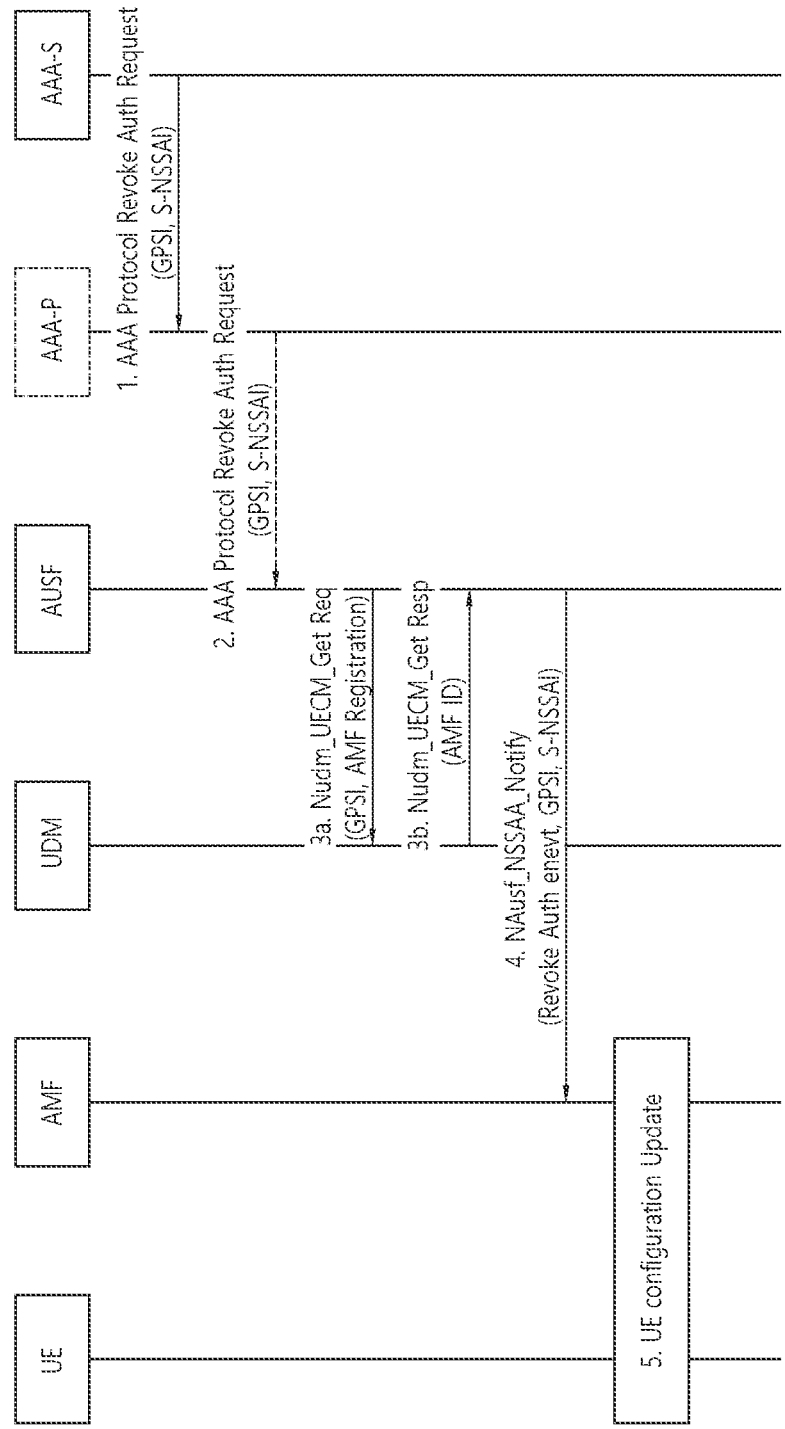
FIG. 10 is a flowchart illustrating a network slice-specific authorization revocation procedure.

FIG. 10 is a flowchart illustrating a network slice-specific authorization revocation procedure.

1) The AAA server (i.e., AAA-S) may request the revocation of authorization for the network slice specified by the S-NSSAI in the AAA protocol revoke authorization request message, for the UE identified by the GPSI in this message. This message may be sent to AAA-P if it is used.

2) The AAA-P, if present, may relay the request to the AUSF.

3a-3b) The AUSF may get AMF ID from the UDM using Nudm_UECM_Get with the GPSI in the received AAA message.

4) The AUSF may notify revoke authorization event to the AMF to revoke the S-NSSAI authorization for the UE using Nausf_NSSAA_Notify with the GPSI and S-NSSAI in the received AAA message. The callback URI of the notification for the AMF may be derived via NRF.

5) The AMF may update the UE configuration to revoke the S-NSSAI from the current allowed NSSAI, for any access type for which network slice-specific authentication and authorization had been successfully run on this S-NSSAI. The UE configuration update may include a request to register if the AMF needs to be re-allocated. The AMF provides a new allowed NSSAI to the UE by removing the S-NSSAI for which authorization has been revoked. The AMF provides new rejected NSSAIs to the UE including the S-NSSAI for which authorization has been revoked. If no S-NSSAI is left in allowed NSSAI for an access after the revocation, and a default NSSAI exists that requires no network slice-specific authentication, then the AMF may provide a new allowed NSSAI to the UE containing the default NSSAI. If no S-NSSAI is left in allowed NSSAI for an access after the revocation, and no default NSSAI can be provided to the UE in the allowed NSSAI, then the AMF may execute the network-initiated deregistration procedure for the access. The AMF may include in the de-registration request message the list of rejected S-NSSAIs, each of them with the appropriate rejection cause value.

<Problems to be Solved by the Disclosure of the Present Specification>

In a mobile communication system to which network slicing is applied, when the network control node serving the UE, such as AMF, cannot be found while performing a network slice-specific re-authentication and re-authorization or a network slice-specific authorization revocation procedure (e.g., In a case where UE is connected by falling back to an Evolved Packet System (EPS) for a voice service, i.e., when the MME of the EPC is serving the UE), a normal procedure cannot be completed.

Therefore, when the UE is connected to 5GS again, there is a need for an effective network control method that can apply the updated re-authentication (Re-Auth) or authorization revocation (Revoke Auth) policy.

<Disclosure of the Present Specification>

The disclosures of the present specification provide methods for solving the above-described problems.

The disclosures of the present specification consist of a combination of one or more operations/configurations/steps described below.

I. Overview of the Disclosures of the Present Specification

I-1. AUSF Functions

The AUSF improved by the disclosure of the present specification may receive one or more of the following information from the UDM.

i) information that there is no serving AMF for the UE ii) Indication of whether to maintain the network slice-specific re-authentication and re-authorization execution event received from the AAA server In the case of maintaining the network slice-specific re-authentication and re-authorization execution event, the AUSF may manage network slice-specific events of the corresponding UE.

After receiving information about the serving AMF from the UDM (it may subscribe a service to be informed by the UDM when recognizing the serving AMF in advance), the AUSF may transmit network slice-specific events of the corresponding UE to the AMF.

I-2. UDM Functions

The UDM improved by the disclosure of the present specification may provide serving AMF information at the request of the AUSF.

If there is no information of the serving AMF, the UDM improved by the disclosure of the present specification may determine whether to request the AUSF to maintain a re-authentication (Re-Auth) or authorization revocation (Revoke Auth) event, based on operator policy and UE's subscriber information and slice type (e.g., for a specific slice for which Re-Auth/Revoke Auth frequently occurs so that it is meaningful to immediately notify the result to the UE). The UDM may transmit, to the AUSF, an indication of whether to maintain the network slice-specific re-authentication and re-authorization execution event according to the determination.

II. Implementation Example

In the illustrated drawings, not all steps are necessarily performed, and some steps may be omitted if necessary.

Figure 11:
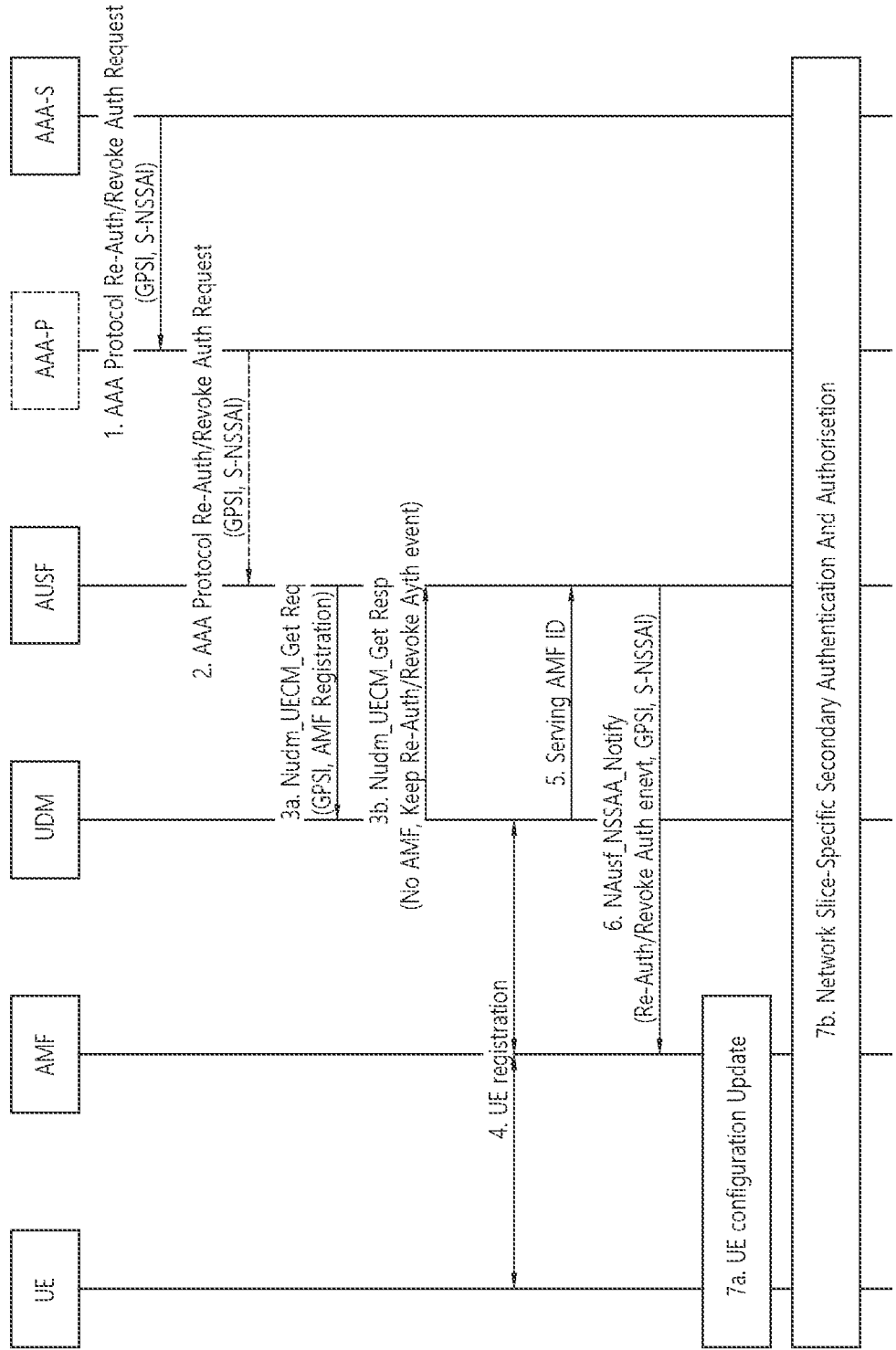
FIG. 11 is a flowchart illustrating a network slice-specific re-authentication and re-authorization procedure according to the disclosure of the present specification.

FIG. 11 is a flowchart illustrating a network slice-specific re-authentication and re-authorization procedure according to the disclosure of the present specification.

Some of the steps shown in FIG. 11 are the same as those shown in FIG. 9. Therefore, in the following, the different steps will be mainly described, and the same steps will follow the description with reference to FIG. 9.

3) After the UDM recognizes that there is no serving AMF, based on the operator policy and the UE's subscriber information and the slice type (e.g., for a specific slice for which Re-Auth/Revoke Auth frequently occurs so that it is meaningful to immediately notify the result to the UE), the UDM decides whether to request the AUSF to maintain the network slice-specific Re-Auth/Revoke Auth event. The UDM transmits to the AUSF information that there is no current serving AMF for the UE and/or an indication of whether to maintain a Re-Auth/Revoke Auth event.

Thereafter, the AUSF manages the history of the network slice-specific authentication/authorization requests for the corresponding UE.

4) When the UE attempts to access, e.g., 5GS, the UDM finds the serving AMF of the UE.

5) The UDM delivers information about the UE's serving AMF to the AUSF. To this end, the AUSF may subscribe in advance to a service to be informed by the UDM of information on the UE's serving AMF.

6) The AUSF transmits notification information about authentication/authorization events to the serving AMF based on the information managed so far.

7a-7b) If necessary, the AMF initiates a UE configuration update or the network slice-specific re-authentication and re-authorization procedure.

IV. Summary of the Disclosure of the Present Specification

According to the disclosure of the specification, the AUSF receives one or more of the following information from the UDM.

i) information that there is no serving AMF for the UE ii) information on whether to maintain the network slice-specific re-authentication and re-authorization execution event received from the AAA server When the AUSF improved according to the disclosure of the present specification receives, from the UDM, information to maintain the network slice-specific re-authentication and re-authorization execution event, the AUSF may manage the network slice-specific event of the corresponding UE.

After the AUSF improved according to the disclosure of the present specification receives information about the serving AMF from the UDM, the AUSF may transmit the network slice-specific event of the UE, which has been managed, to the corresponding AMF.

According to the above description, the network node can recognize the Revoke Auth event more quickly, and there is no need to perform authentication/authorization unnecessarily, thereby reducing network signaling. In addition, the network node can deliver information about the licensed network slice to the UE more quickly. In addition, it is possible to clearly recognize a situation in which re-authentication/re-authorization is necessary, and as a result, information on the network slice allowed to be used can be delivered to the UE more quickly.

Figure 12:
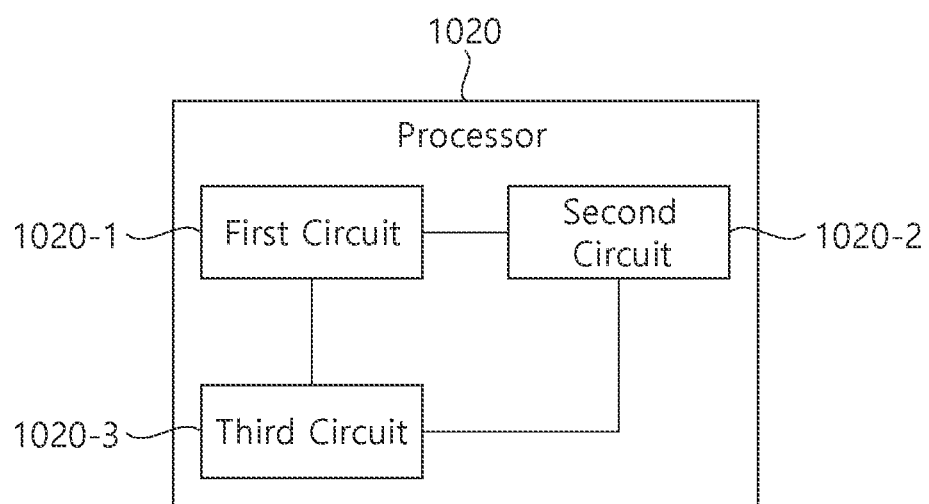
FIG. 12 shows a block diagram of a processor in which the disclosure of the present specification is implemented.

FIG. 12 shows a block diagram of a processor in which the disclosure of the present specification is implemented.

As can be seen with reference to FIG. 12, a processor 1020 in which the disclosure of the present specification is implemented includes a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and may include at least one of a Digital Signal Processor (DSP), a Central Processing Unit (CPU), and a Graphics Processing Unit (GPU).

The processor may be included in a UE, a base station, AMF, SMF, AUSF or UDM.

A case in which the processor is included in the AUSF will be described.

The first circuit 1020-1 of the processor included in the AUSF may request, from a Unified Data Management (UDM) device, information on a serving Access and mobility Management Function (AMF) device for a User Equipment (UE).

The second circuit 1020-2 of the processor included in the AUSF may receive, from the UDM device, information informing that there is no serving AMF device for the UE and an indication informing or indicating maintenance of information on a network slice-specific authentication and authorization.

The third circuit 1020-3 of the processor included in the AUSF may receive, from the UDM device, information on a new serving AMF device for the UE.

A fourth circuit (not shown) of the processor included in the AUSF may transmit, to the new serving AMF device, information on authentication or authorization.

A fifth circuit (not shown) of the processor included in the AUSF may manage the information on the network slice-specific authentication and authorization for the UE, based on the information informing that there is no serving AMF device for the UE and the indication.

In order to manage the information on the network slice-specific authentication and authorization for the UE, A fifth circuit (not shown) of the processor included in the AUSF may store and maintain information informing that the network slice-specific authentication and authorization for the UE are required. In addition, a fifth circuit (not shown) of the processor included in the AUSF may perform a procedure for the network slice-specific authentication and authorization.

A sixth circuit (not shown) of the processor included in the AUSF may receive, from an Authentication Authorization Accounting (AAA) server, information on the network slice-specific authentication and authorization.

The information on the new serving AMF device for the UE may be received based on the UE trying to access.

The information informing that there is no serving AMF device for the UE may be received based on the UE's fallback to an Evolved Packet System (EPS) for a voice service.

The authentication and the authorization may comprise a re-authentication and a re-authorization.

Next, a case in which the processor is included in the UDM will be described.

The first circuit 1020-1 of the processor included in the UDM may receive, from an Authentication Server Function (AUSF) device, a request for information on a serving Access and mobility Management Function (AMF) device for a User Equipment (UE);

The second circuit 1020-2 of the processor included in the UDM may transmit, to the AUSF device, information informing that there is no serving AMF device for the UE and an indication informing or indicating maintenance of information on a network slice-specific authentication and authorization.

The third circuit 1020-3 of the processor included in the UDM may transmit, to the AUSF device, information on a new serving AMF device for the UE.

A fourth circuit (not shown) of the processor included in the UDM may determine whether to revoke re-authentication or authentication for the UE.

For the determination, operator policy, subscriber information of the UE, and information on a slice type may be considered.

The information on the new serving AMF device for the UE may be transmitted based on the UE trying to access.

The information informing that there is no serving AMF device for the UE may be transmitted based on the UE's fallback to an Evolved Packet System (EPS) for a voice service.

A fifth circuit (not shown) of the processor included in the UDM may receive, from the AUSF device, a request to transmit information on a new serving AMF device for the UE.

The authentication and the authorization may comprise a re-authentication and a re-authorization.

Figure 13:
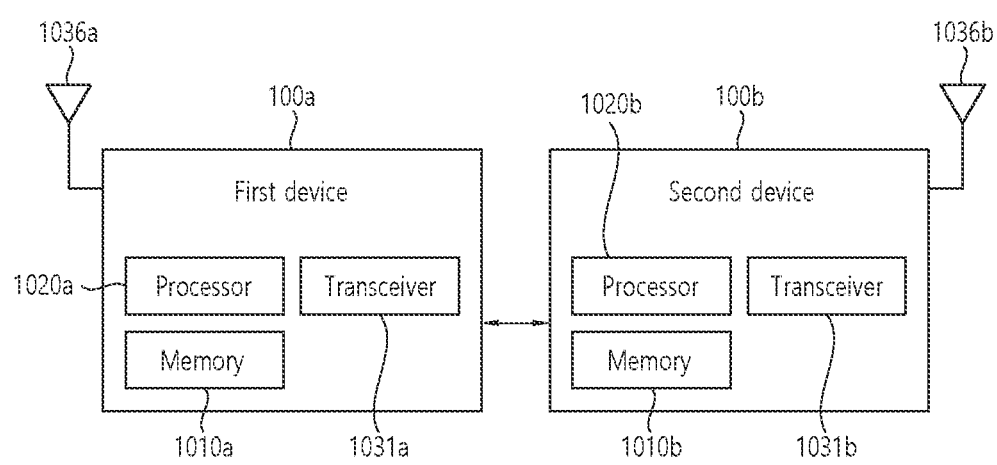
FIG. 13 illustrates a wireless communication system according to an embodiment.

FIG. 13 illustrates a wireless communication system according to an embodiment.

Referring to FIG. 13, the wireless communication system may include a first device 100*a* and a second device 100*b*.

The first device 100*a* may be a UE described in the disclosure of the present specification. Or, the first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 14:
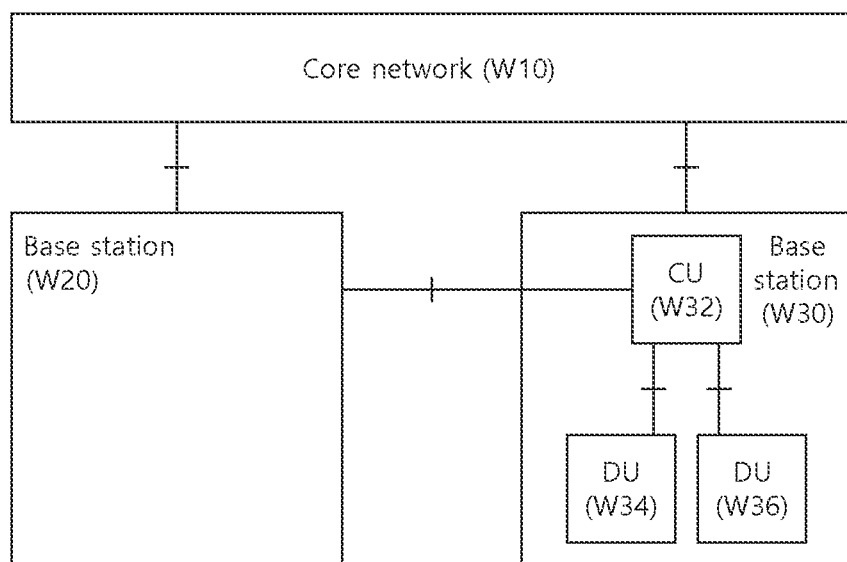
FIG. 14 illustrates a block diagram of a network node according to an embodiment.

FIG. 14 illustrates a block diagram of a network node according to an embodiment.

In particular, FIG. 14 is a diagram illustrating in detail a case in which a base station is divided into a Central Unit (CU) and a Distributed Unit (DU).

Referring to FIG. 14, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Orotocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 15:
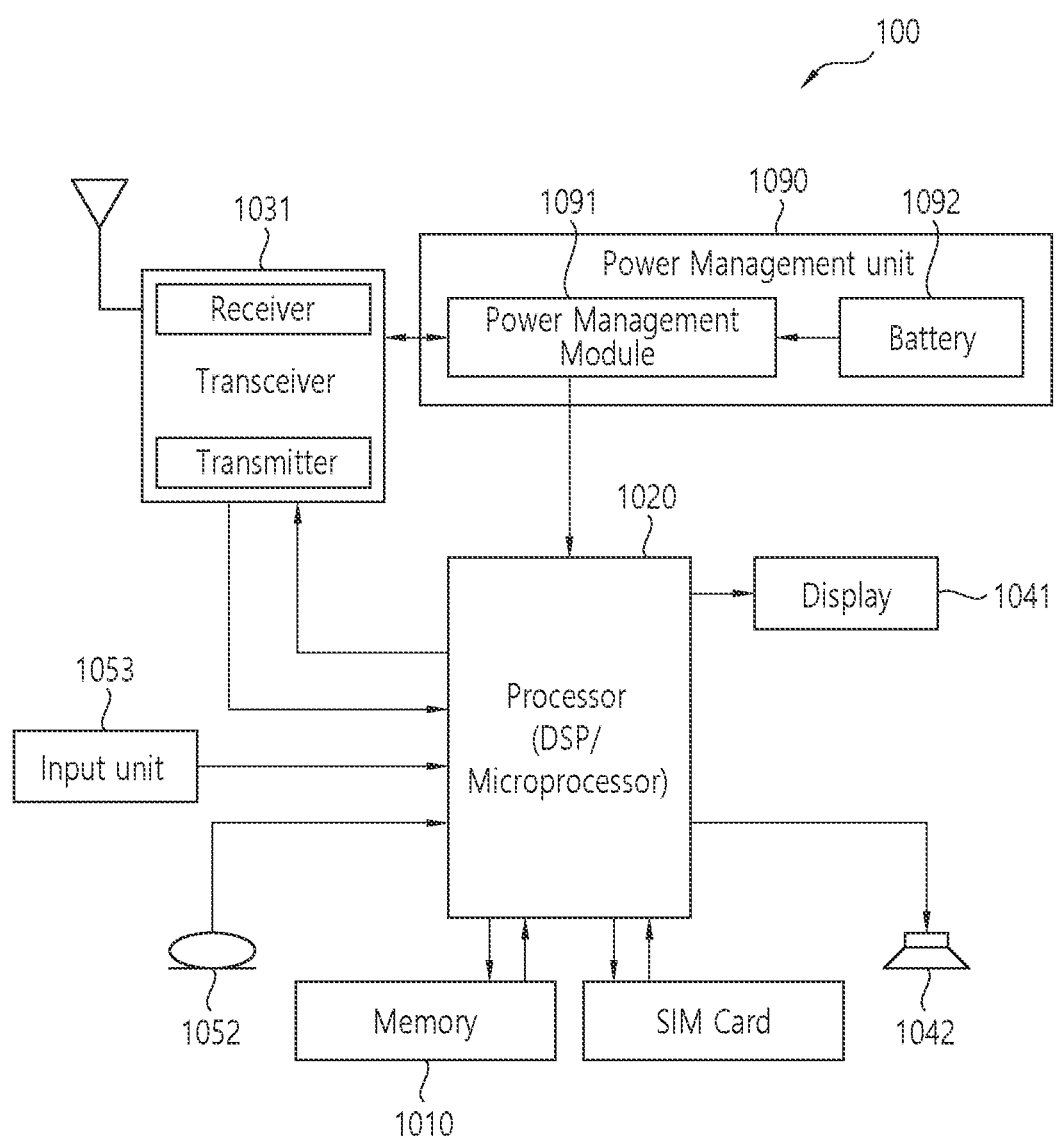
FIG. 15 is a block diagram illustrating a configuration of a UE according to an embodiment.

FIG. 15 is a block diagram illustrating a configuration of a UE according to an embodiment.

In particular, the UE 100 shown in FIG. 15 is a diagram illustrating the first device in FIG. 13 in more detail.

A UE 100 includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 16:
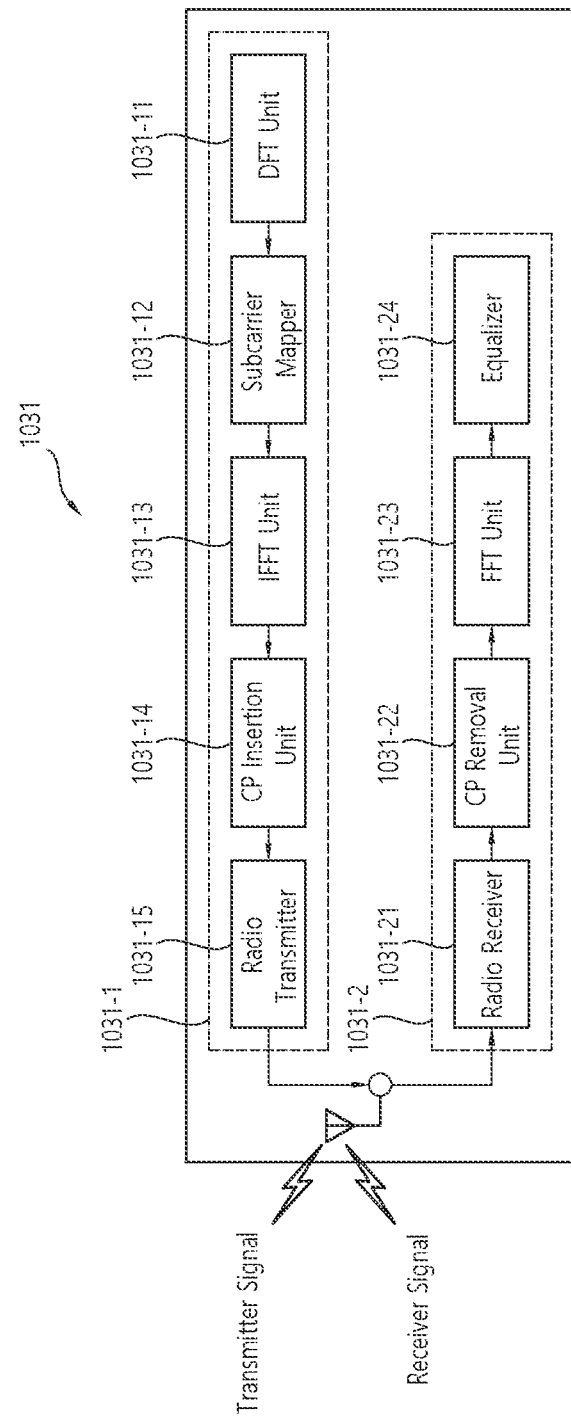
FIG. 16 is a detailed block diagram illustrating the transceiver of the first device shown in FIG. 13 or the transceiver of the device shown in FIG. 15 in detail.

FIG. 16 is a detailed block diagram illustrating the transceiver of the first device shown in FIG. 13 or the transceiver of the device shown in FIG. 15 in detail.

Referring to FIG. 16, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 17:
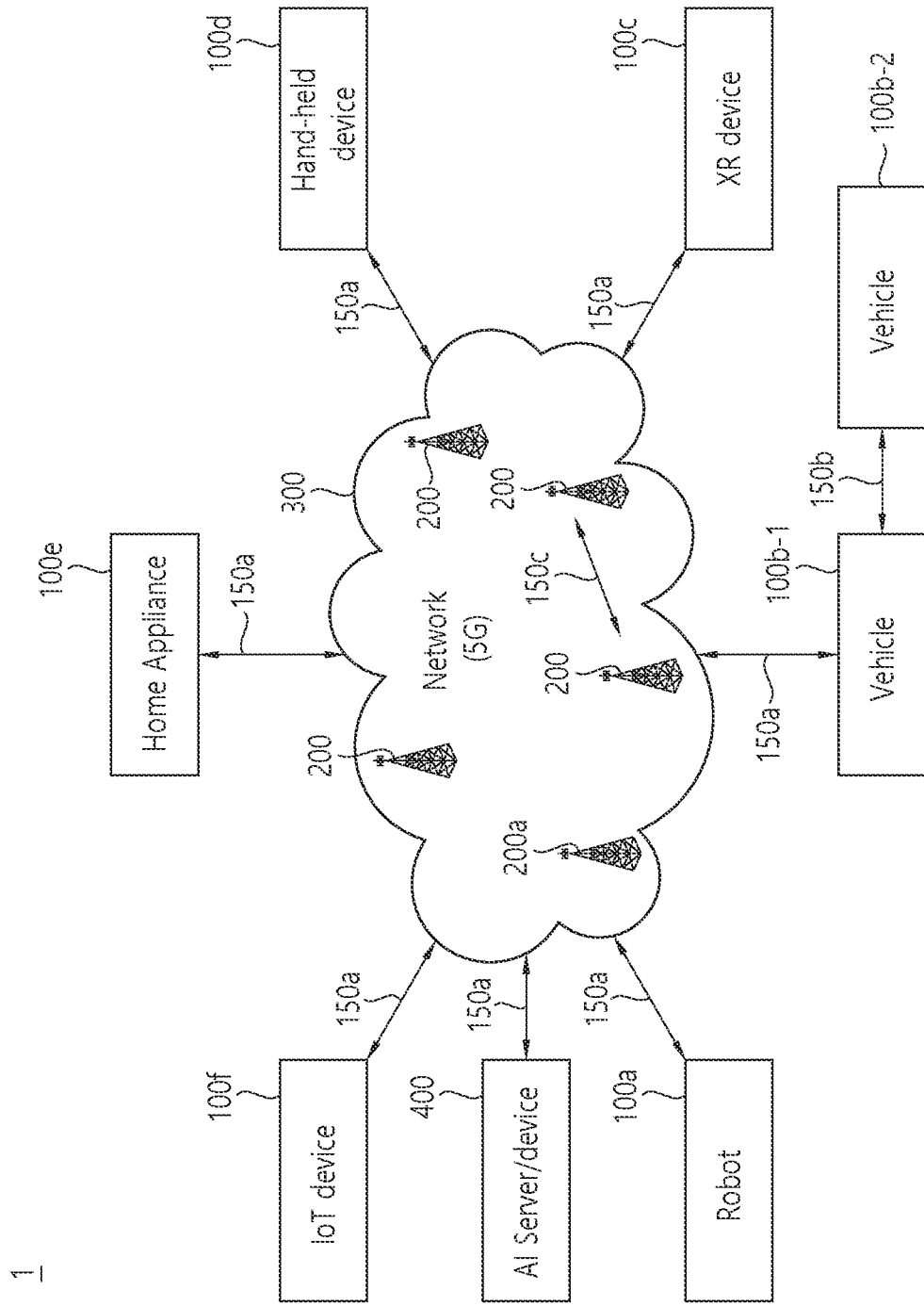
FIG. 17 illustrates a communication system 1 applied to the disclosure of the present specification.

FIG. 17 illustrates a communication system 1 applied to the disclosure of the present specification.

Referring to FIG. 17, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by a first device related to an authentication server function, the method comprising:
   requesting, by the first device from a second device related to a unified data management, serving access mobility management function information for a User Equipment (UE);
   receiving, by the first device from the second device, i) first information informing that there is no serving access mobility management function expected for the UE and ii) second information informing maintenance of network slice-specific authentication and authorization events for the UE;
   managing the network slice-specific authentication and authorization events for the UE based on the first information and the second information;
   receiving, by the first device from the second device, third information regarding a new serving access mobility management function for the UE; and
   transmitting, by the first device to a third device related to the new serving access mobility management function, the network slice-specific authentication and authorization events for the UE which have been managed and used for the third device to perform UE configuration update and/or a network slice-specific authentication and authorization.

2. The method of claim 1, wherein the managing the network slice-specific authentication and authorization events for the UE comprises:
   storing and maintaining information informing that the network slice-specific authentication and authorization for the UE are required; and
   performing a procedure for the network slice-specific authentication and authorization.

3. The method of claim 1, further comprising receiving, by the first device from an Authentication Authorization Accounting (AAA) server, the network slice-specific authentication and authorization events for the UE.

4. The method of claim 1, wherein the third information is received based on the UE trying to access.

5. The method of claim 1, wherein the first information is received based on a fallback of the UE to an Evolved Packet System (EPS) for a voice service.

6. The method of claim 1, wherein the network slice-specific authentication and the authorization comprise a network slice-specific re-authentication and re-authorization.

7. A method performed by a second device related to a united data management, the method comprising:
   receiving, by the second device from a first device related to an authentication server function, a request for serving access mobility management function information for a User Equipment (UE);
   transmitting, by the second device to the first device, i) first information informing that there is no serving access mobility management function expected for the UE and ii) an indication second information informing maintenance of network slice-specific authentication and authorization events for the UE; and
   transmitting, by the second device to the first device, third information regarding a new serving access mobility management function for the UE.

8. The method of claim 7, further comprising determining whether to revoke re-authentication or authentication for the UE.

9. The method of claim 8, wherein the determining whether to revoke comprises considering an operator policy, subscriber information of the UE, and information regarding a slice type.

10. The method of claim 7, wherein the third information is transmitted based on the UE trying to access.

11. The method of claim 7, wherein the first information is transmitted based on a fallback of the UE to an Evolved Packet System (EPS) for a voice service.

12. The method of claim 7, wherein the network slice-specific authentication and the authorization comprise a network slice-specific re-authentication and re-authorization.

13. A chipset mounted on a first device related to an authentication server function, the chipset comprising:
 at least one processor; and
 at least one memory for storing instructions and operably electrically connectable to the at least one processor,
 wherein the instructions, based on being executed by the at least one processor, cause the first device to perform operations comprising:
  requesting, from a second device related to a unified data management, serving access mobility management function information for a User Equipment (UE);
  receiving, from the second device, i) first information informing that there is no serving access mobility management function for the UE and ii) second information informing maintenance of network slice-specific authentication and authorization events for the UE;
  managing the network slice-specific authentication and authorization events for the UE based on the first information and the second information;
  receiving, from the second device, third information regarding a new serving access mobility management function for the UE; and
  transmitting, to a third device related to the new serving access mobility management function, the network slice-specific authentication and authorization events for the UE which have been managed and used for the third device to perform UE configuration update and/or a network slice-specific authentication and authorization.

\* \* \* \* \*